June 10, 1969  K. PREECE  3,449,606
DYNAMOELECTRIC MACHINE WITH END COVER SECURED
TO SALIENT POLES
Filed July 24, 1967

United States Patent Office 3,449,606
Patented June 10, 1969

3,449,606
DYNAMOELECTRIC MACHINE WITH END COVER SECURED TO SALIENT POLES
Kenneth Preece, Solihull, England, assignor to Joseph Lucas (Industries) Limited, Birmingham, England
Filed July 24, 1967, Ser. No. 655,496
Claims priority, application Great Britain, Aug. 8, 1966, 35,376/66
Int. Cl. H02k 5/02
U.S. Cl. 310—89    3 Claims

ABSTRACT OF THE DISCLOSURE

A dynamoelectric machine including a yoke, pole pieces carried by the yoke, and an end cover secured to the yoke by means including one or more axially extending shanks carried by one or more of the pole pieces respectively, and engaging the end cover.

---

This invention relates to dynamoelectric machines of the kind including a yoke, pole pieces carried by the yoke, and an end cover secured to the yoke.

The object of the invention is to provide a convenient means for holding the end cover in position.

According to the invention in a dynamoelectric machine of the kind specified the end cover is held in position against the yoke by means including one or more axially extending shanks carried by one or more of the pole pieces respectively and engaging the end cover.

Figure 1:
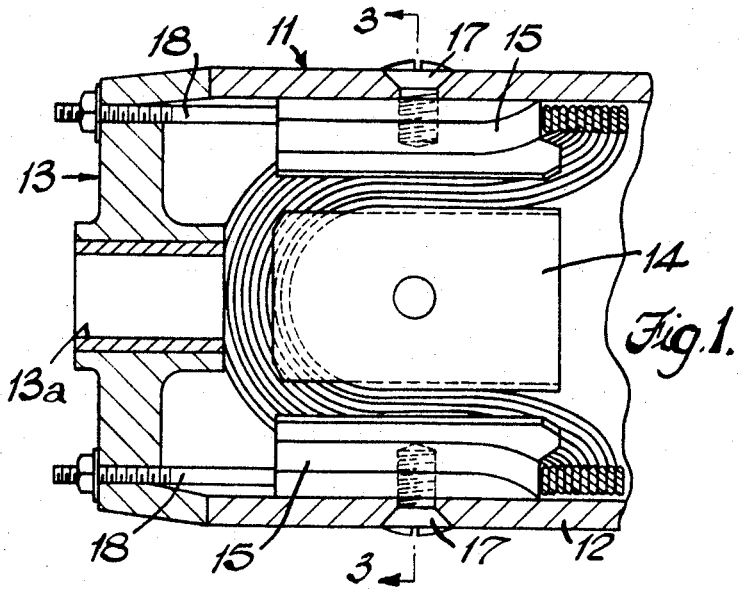
Figure 2:
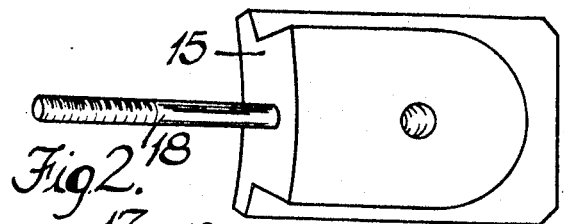
Figure 3:
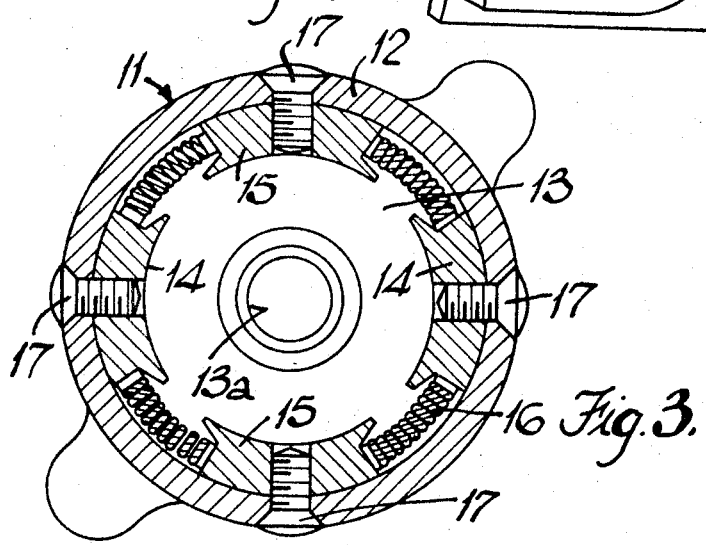

One example of the invention is illustrated in the accompanying drawings wherein:

FIGURE 1 is a fragmentary sectional view of a dynamoelectric machine with its rotor removed for clarity, FIGURE 2 is a perspective view of one of the poles seen in FIGURE 1, and FIGURE 3 is a sectional view on the line 3—3 in FIGURE 1, with parts thereof omitted for clarity.

Referring to the drawings, the dynamoelectric machine includes a stator assembly 11 comprising a hollow cylindrical yoke 12 closed at one end, by an end cover 13, the cover 13 being formed with a centrally disposed bearing member 13a for the rotor assembly (not shown). The other end of the yoke 12 is closed in use by a second end plate (not shown) which carries the brush assembly of the machine together with a second bearing member for the rotor assembly.

Secured on the inner surface of the yoke 12 by means of screws 17, are two pairs of axially extending pole pieces 14, 15, the four pole pieces being equiangularly spaced. The pole pieces 14, 15 are each formed with one flat end and one rounded end, the rounded ends of the pole pieces 15 being adjacent the closed end of the yoke 12 and the rounded ends of the pole pieces 14 being remote from the closed end of the yoke 12, so that the rounded ends of adjacent pole pieces are at opposite ends of the yoke.

Each pole piece is further formed on its rounded end and its axial sides with an outwardly directed flange, and trapped between the flange and the yoke 12 is a stator winding 16 which includes portions extending substantially axially and interconnected by further portions extending around the rounded ends of the pole pieces.

The pole pieces 14 carry at their flat ends axially extending screw threaded shanks 18, which extend through the end cover 13 of the machine. Nuts are engaged with the shanks 18 and serve to hold the cover 13 in position closing the one end of the yoke 12.

It will be appreciated that either or both end plates of the machine can be secured to the yoke 12 by shanks 18 extending from the pole pieces 14, 15.

Having thus described my invention what I claim as new and desire to secure by Letters Patent is:

1. A dynamoelectric machine wherein the end cover is held in position against the yoke by means including at least one axially extending shank carried by at least one of the pole pieces engaging said end cover.

2. A machine as claimed in claim 1 wherein said means includes a pair of axially extending shanks carried respectively by a pair of pole pieces positioned diametrically opposite one another on the yoke.

3. A machine as claimed in claim 2 wherein said shanks are provided respectively with screw threaded portions which extend through said end cover and which receive nuts for securing said end cover in position.

References Cited

UNITED STATES PATENTS

| | | | |
|---|---|---|---|
| 1,358,809 | 11/1920 | Wilson | 310—254 |
| 1,156,639 | 8/1915 | Starker | 310—258 |
| 1,557,000 | 8/1925 | Kuhls | 310—254 |
| 3,217,194 | 11/1965 | Terry | 310—185 |

WARREN E. RAY, *Primary Examiner.*

R. SKUDY, *Assistant Examiner.*

U.S. Cl. X.R.
310—218, 254